H. H. GREEN.
VEHICLE TIRE RIM.
APPLICATION FILED OCT 6, 1919.
1,345,670.
Patented July 6, 1920.
2 SHEETS—SHEET 1.
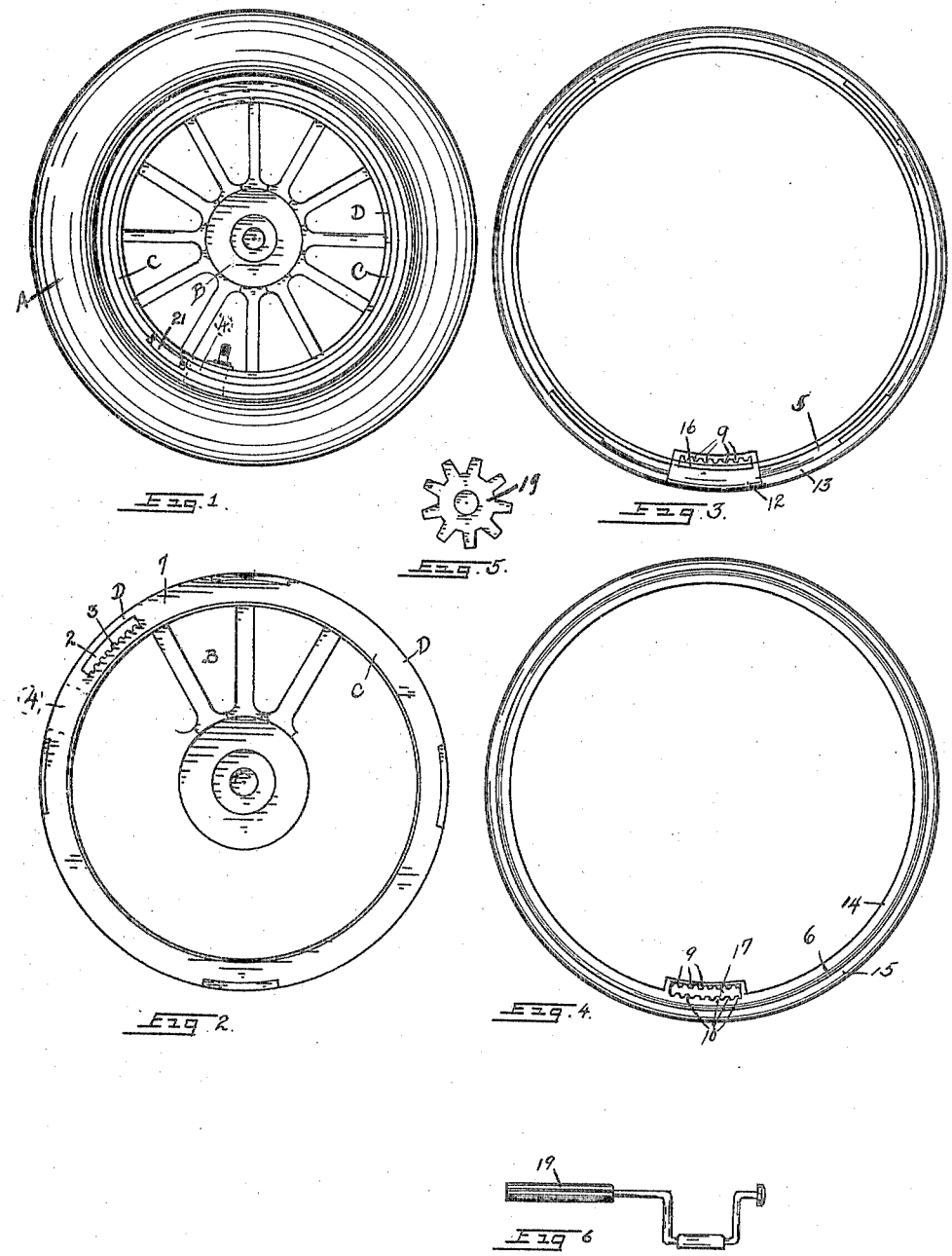
INVENTOR
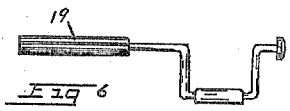
Herman H. Green
BY J. M. Thomas
ATTORNEY

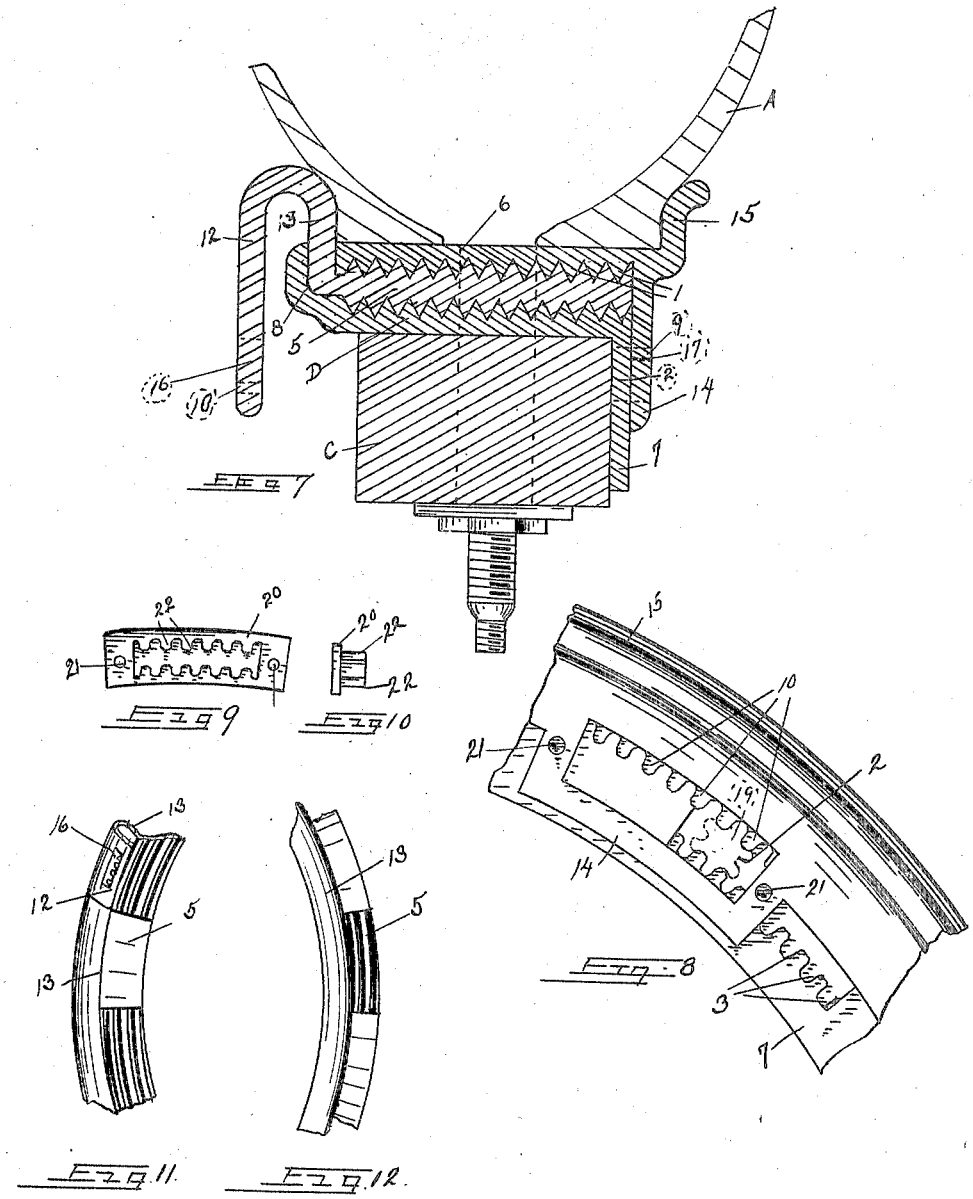
H. H. GREEN.
VEHICLE TIRE RIM.
APPLICATION FILED OCT 6, 1919.
1,345,670.
Patented July 6, 1920.
2 SHEETS—SHEET 2.
Herman H Green
INVENTOR
BY J. M. Thomas
ATTORNEY

UNITED STATES PATENT OFFICE.

HERMAN H. GREEN, OF SALT LAKE CITY, UTAH.

VEHICLE-TIRE RIM.

1,345,670.     Specification of Letters Patent.     Patented July 6, 1920.

Application filed October 6, 1919. Serial No. 328,893.

*To all whom it may concern:*

Be it known that I, HERMAN H. GREEN, a citizen of the United States, residing at Salt Lake City, in the county of Salt Lake and State of Utah, have invented certain new and useful Improvements in Vehicle-Tire Rims, of which the following is a specification.

My invention relates to vehicle wheels, and has for its object to provide a wheel rim upon which the tire may be easily and quickly secured and the rim fastened on the wheel by new and novel means; the invention being in the means used and the construction thereof of the rim and of securing it in place on the wheel of an automobile or truck using the pneumatic principle in the tires.

These objects I accomplish with the device illustrated in the accompanying drawings in which similar letters and numerals of reference indicate like parts throughout the several figures and as described in the specification forming a part of this application and pointed out in the appended claim.

In the drawings in which I have shown a substantial embodiment of my invention, Figure 1 is a side elevation of an automobile wheel with the tire rim held in place thereon with my device. Fig. 2 is a side elevation of an automobile wheel with the tire and rim removed and showing my construction of the felly band. Fig. 3 is a side elevation of the rim showing the side nearest the chassis of the automobile. Fig. 4 is the side of the rim away from the chassis. Fig. 5 is an end view of a specially designed pinion used to remove and replace my device on a wheel. Fig. 6 is a side view of the tool showing a plan view of the pinion used in removing or replacing my device on a wheel. Fig. 7 is a radial section of the felly, felly band, rim and portions of a tire in place thereon. Fig. 8 is a fragmentary view in side elevation of the felly band and tire rim. Fig. 9 is a plan view of the locking member. Fig. 10 is an end elevation of the locking member. Fig. 11 is a fragmentary view in perspective of one of the rim bands. Fig. 12 is another fragmentary view in perspective of the same band.

In order to facilitate the removal of a rim from an automobile tire and to retain said rim on the wheel of any vehicle using the pneumatic principle in its tires I have invented certain new and useful improvements in the felly band, and rim which coact to secure the desired result.

In the drawings I show the tire as A and the wheel hub and spokes as B with the felly as C and the felly band as D. In the peripheric face of the felly band I cut external threads 1 circumferentially positioned and at such an angle that a partial rotation of about four inches will grip the rim on the felly band. I then cut out sections of said threads transversely across the said face, preferably four of such sections are cut out, each of which is spaced from the other so there will be four sections of threads and four blanks or unthreaded sections in the circumference of the band. On one edge of said felly band an inwardly turned flange 7 is integrally formed thereon in which flange portion I cut an arc shaped slot 2 with teeth 3 formed on one side of the slot. On the other edge of said felly band an outwardly extended flange 8 is integrally formed. A slot is cut through the felly C and also through said felly band D for the air valve stem, which slot is shown as 4. The rim I use is made of two coacting bands 5 and 6 with intermeshing interrupted threads running circumferentially around each. The said band 5 also has interrupted or spaced apart sections of internal threads circumferentially positioned and adapted to mesh with the threads 1, on the periphery of said felly band D.

The sections of intermeshing threads of the two rim bands 5 and 6 are cut radially outward of the unthreaded sections of the felly band, so that on the band 5 the external threads will occur radially opposite the internal unthreaded sections and the internal threads will be radially opposite the external unthreaded sections of the said band. A rack flange 12 is integrally formed on a portion of one edge of a tire gripping flange 13 which is integral with one edge of said band 5, while the coacting band 6 has both an inwardly, and an outwardly turned flange on one edge thereof. The inwardly turned flange 14 bears against the flange 7 of the felly band, and the outwardly turned flange 15 will bear against and grip the edge of the tire casing of the tire in opposition to the flange 13. A slotted arc shaped opening 16 is provided in said rack flange 12 on said band 6 with one side of said slot provided with teeth 9 to coact with the teeth 3 of the slot 2. In the flange 14 an arc shaped slot 17 is cut in alinement with said slot 2 and on one side of said slot 17 teeth 10 are cut to coact with the teeth 3 of the slot 2. I provide a detachable closure plate 20 for said arc shaped slot 17 which is shown in Figs. 9 and 10 to prevent dust and moisture from entering between the bands 5 and 6, and also between the said band 5 and the felly band C. The said closure plate may be easily removed to allow the insertion of the pinion carrying tool shown in Fig. 6, by which the said bands are moved. On said closure plate 20 are provided teeth 22 adapted to engage the teeth 3 and 10 of the respective slots 2 and 17 to lock the rim on the wheel. The operation of my invention is as follows:—The said band 6 is turned with the flanges 14 and 15 downward and the uninflated tire A is slipped on the band 6, the band 5 is then to be inserted within band 6 by the unthreaded sections of one band passing transversely the threaded sections of the other band. The flanges 15 and 13 will then be in gripping contact with the edges of said tire A and the intermeshing threads of said bands 5 and 6 will be in partial alinement but not yet engaged. The pinion carrying tool is then inserted through the arc shaped slots 16 and 17 with the teeth of the pinion engaging the teeth cut in both of said slots, as shown in Fig. 8, and by turning said pinion carrying tool as a hand brace both of said bands 5 and 6 are made to travel circumferentially but in opposite directions and the threads of the said bands 5 and 6 are made to engage and the band 5 is thus drawn laterally farther within the band 6. When the tire is then inflated the rim and tire thereon are secured on the wheel by inserting the air valve stem through the slot 4 and the rim is slipped over the felly band D by the unthreaded sections of the band 5 passing transversely the threaded sections of the felly band. The flange 14 of the band 5 will be adjacent yet not bear against the flange 7 of the felly band, while the flange 8 of the felly band D will be adjacent but not bear against the flange 13 of the band 5. The pinion carrying tool is then inserted through the arc shaped slot 17 of the flange 14 and slot 2 of the flange 7 and into engagement with the teeth 3 of the slot 2 and the opposing teeth 10 in the slot 17, then by again turning the pinion carrying tool as a hand brace, the rim and wheel are made to rotate on their axes and the sections of circumferential threads are made to engage and the flanges 14 and 7, and 8 and 13 will be respectively brought into gripping contact. Then by inserting the locking member 20 the rim is firmly and rigidly held in place on the wheel. The said locking member 20 is held in place by counter sunk tap bolts through the holes 21, the said locking member also acting as a closure.

Having thus described my invention and its operation I desire to secure by Letters Patent and claim:—

An automobile tire rim comprising a metal band having an inwardly and outwardly extended flange on one edge; interrupted circumferentially disposed threads thereon; an arc shaped slot cut in the inwardly extended flange with teeth cut in one side of said slot; a coacting metal band of less diameter than the first mentioned metal band and having an outwardly extended flange thereon with a portion formed into a rack flange; an arc shaped slot in said rack flange with teeth cut in one side of said slot; interrupted circumferentially disposed threads in said coacting metal band intermeshing with the circumferentially disposed threads of the first mentioned metal band; and means to engage the teeth in said slots to move said metal bands one within the other to engage the circumferentially disposed threads of one band with the like threads of the other band.

In testimony whereof I have affixed my signature.

HERMAN H. GREEN